(12) United States Patent  (10) Patent No.: US 7,665,484 B2
Kamada et al.  (45) Date of Patent: Feb. 23, 2010

(54) FLUID COUPLING

(75) Inventors: Seiji Kamada, Yokohama (JP); Hiroshi Kumagai, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 11/941,310

(22) Filed: Nov. 16, 2007

(65) Prior Publication Data
US 2008/0067805 A1 Mar. 20, 2008

Related U.S. Application Data

(62) Division of application No. 11/141,384, filed on Jun. 1, 2005, now abandoned.

(30) Foreign Application Priority Data

Jun. 1, 2004 (JP) ............... 2004-163141

(51) Int. Cl.
*F16L 55/04* (2006.01)
(52) U.S. Cl. .................. 138/30; 138/46
(58) Field of Classification Search .......... 138/30, 138/31, 46
See application file for complete search history.

(56) References Cited

U.S. PATENT DOCUMENTS

| 2,829,669 | A |   | 4/1958  | Luzynski               |
|-----------|---|---|---------|------------------------|
| 2,904,077 | A |   | 9/1959  | Konrad                 |
| 3,001,268 | A | * | 9/1961  | Greer ........... 29/890.06 |
| 3,076,479 | A |   | 2/1963  | Kai                    |
| 3,159,182 | A | * | 12/1964 | Peters .......... 138/30 |
| 3,237,715 | A |   | 3/1966  | Peters                 |
| 3,534,884 | A |   | 10/1970 | Suter                  |
| 3,714,964 | A | * | 2/1973  | Livingston ...... 137/513.3 |
| 4,177,023 | A |   | 12/1979 | Kamiya et al.          |
| 4,527,580 | A |   | 7/1985  | Chheda                 |
| 4,903,486 | A |   | 2/1990  | Finkle                 |
| 4,996,962 | A |   | 3/1991  | Usui                   |
| 5,415,201 | A | * | 5/1995  | Shiffler et al. ........ 137/614.11 |
| 5,638,868 | A |   | 6/1997  | Loran                  |
| 5,740,837 | A |   | 4/1998  | Chiang                 |
| 5,797,430 | A | * | 8/1998  | Becke et al. ........ 138/30 |
| 5,845,621 | A |   | 12/1998 | Robinson et al.        |
| 5,954,031 | A |   | 9/1999  | Ogiso et al.           |
| 6,076,557 | A |   | 6/2000  | Carney                 |
| 6,098,663 | A |   | 8/2000  | Larsen                 |
| 6,390,132 | B1 |  | 5/2002  | Johnson et al.         |
| 6,412,476 | B1 |  | 7/2002  | Thompson et al.        |
| 6,672,286 | B2 |  | 1/2004  | Miandoab et al.        |
| 6,904,894 | B2 |  | 6/2005  | Serizawa et al.        |
| 2002/0079470 | A1 | * | 6/2002 | Chen .............. 251/61.1 |

FOREIGN PATENT DOCUMENTS

| CN | 85102290 B | 12/1987 |
|----|------------|---------|
| CN | 88210181 U | 11/1988 |

(Continued)

*Primary Examiner*—James F Hook
(74) *Attorney, Agent, or Firm*—Foley & Lardner LLP

(57) ABSTRACT

A pulsation absorber is provided in a fluid channel formed in a body of a fluid coupling. Fluid flows through the fluid channel in an assembled state. The pulsation absorber is arranged to deform in a same direction as the fluid to flow in the fluid channel pulsates. The pulsation absorber thereby absorbs pulsation of the fluid.

4 Claims, 5 Drawing Sheets

| | FOREIGN PATENT DOCUMENTS | | |
|---|---|---|---|
| CN | 2092622 U | 1/1992 | |
| CN | 2293822 Y | 10/1998 | |
| CN | 1348059 A | 5/2002 | |
| CN | 2591383 Y | 12/2003 | |
| JP | 58-072795 A | 4/1983 | |
| JP | 02-286995 A | 11/1990 | |
| JP | 07-239160 A | 9/1995 | |
| JP | 08-004615 A | 1/1996 | |
| JP | 08-261097 A | 10/1996 | |
| JP | 08-261098 A | 10/1996 | |
| JP | 08-284778 A | 10/1996 | |
| JP | 09-195885 A | 7/1997 | |
| JP | 09-303231 A | 11/1997 | |
| JP | 2000-073907 A | 3/2000 | |
| JP | 2004-137977 A | 5/2004 | |

* cited by examiner

FLUID COUPLING

The present application is a divisional of U.S. application Ser. No. 11/141,384, filed Jun. 1, 2005, the entire contents of which is incorporated herein by reference.

BACKGROUND OF THE INVENTION

The present invention generally relates to a fluid coupling, and more particularly, to a fluid coupling for use in a fuel supply system of a vehicle.

Japanese Patent Application Publication No. H09 (1997)-195885 discloses a fuel supply system of a fuel returnless type.

SUMMARY OF THE INVENTION

It is an object of the present invention to provide a fluid coupling capable of damping pulsation of fluid effectively, while using a limited space and being small in size and low in cost.

According to one aspect of the present invention, a fluid coupling includes: a body formed with a fluid channel; and a pulsation absorber provided in the fluid channel, and arranged to deform in a same direction as fluid to flow in the fluid channel pulsates, and thereby to absorb pulsation of the fluid.

The other objects and features of this invention will become understood from the following description with reference to the accompanying drawings.

DETAILED DESCRIPTION OF THE INVENTION

Figure 10:
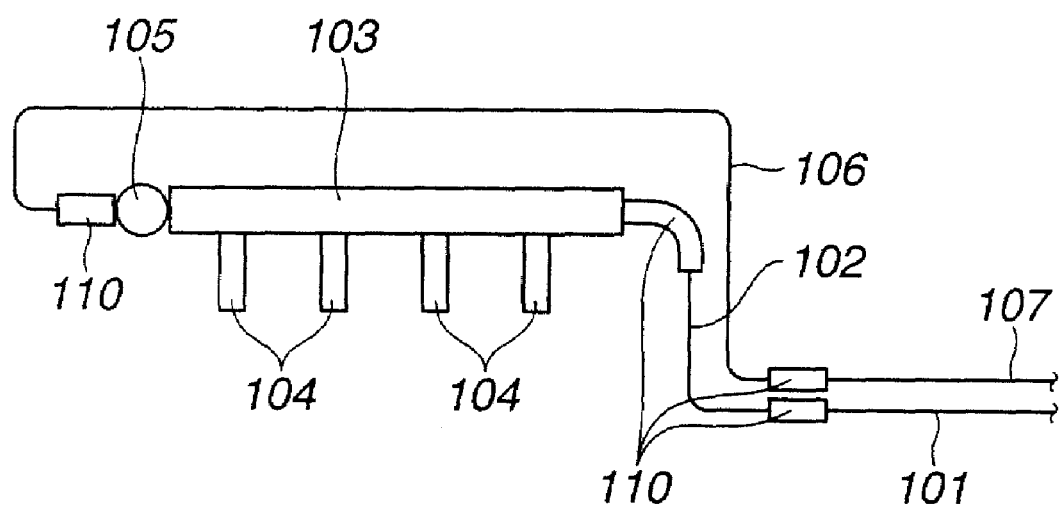
FIG. 10 is a diagram showing a fuel supply system of a return type.

First, in order to facilitate understanding of the present invention, a description will be given of fuel supply systems for a vehicle. FIG. 10 is a diagram showing a fuel supply system of a return type. In this fuel supply system, fuel is supplied from a fuel tank (not shown in FIG. 10) via an underfloor supply line 101 and a supply tube 102 to a delivery pipe 103. Then, the fuel is supplied from delivery pipe 103 to fuel injectors 104 of each cylinder. Delivery pipe 103 is equipped with a pressure regulator 105. Pressure regulator 105 maintains constant pressure in delivery pipe 103 by returning surplus fuel via a return tube 106 and an underfloor return line 107 to the fuel tank.

Figure 11:
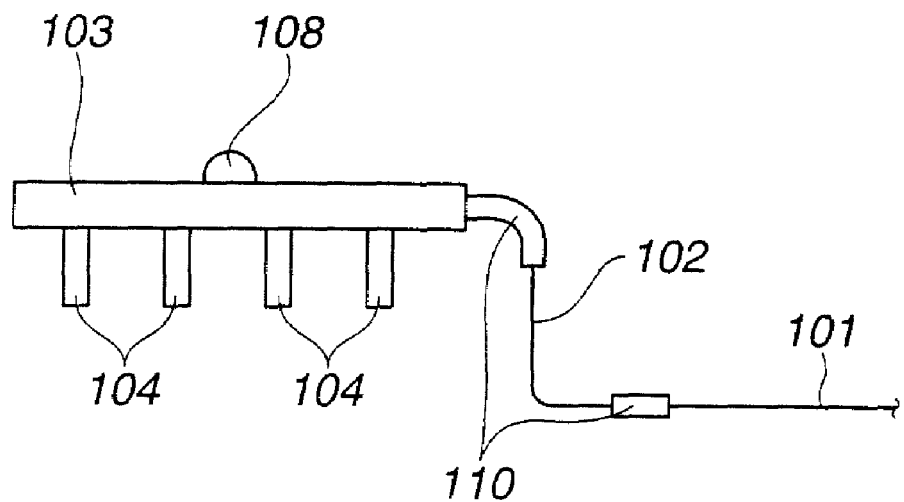
FIG. 11 is a diagram showing a fuel supply system of a returnless (non-return) type.

FIG. 11 is a diagram showing a fuel supply system of a returnless (non-return) type. In this fuel supply system, fuel is supplied from a fuel tank (not shown in FIG. 11) via underfloor supply line 101 and supply tube 102 to delivery pipe 103. Then, the fuel is supplied from delivery pipe 103 to fuel injectors 104. Delivery pipe 103 is equipped with a pulsation damper 108. Pulsation damper 108 damps pulsation, and noise of pulsation, of the fuel which originate from a discharging action of a fuel pump or a fuel injection action of fuel injectors 104.

In the fuel supply system of FIG. 10, fluid couplings or quick connectors 110 are each provided between supply line 101 and supply tube 102, between supply tube 102 and delivery pipe 103, between pressure regulator 105 and return tube 106, and between return tube 106 and return line 107. In the fuel supply system of FIG. 11, fluid couplings 110 are each provided between supply line 101 and supply tube 102, and between supply tube 102 and delivery pipe 103. Generally, each of fluid couplings 110, straight type or elbow type, is made of metal and/or resin, and includes one or two O rings in a joining portion.

Recently, improvements have been required for vehicles to be reduced further in weight and cost. Therefore, such vehicles have employed an increasing number of fuel supply systems of the returnless type which has a smaller number of elements than the return type.

However, in the fuel supply system of the returnless type, pulsation of the fuel is likely to occur on the part of delivery pipe 103, compared with the return type. For this reason, delivery pipe 103 of the returnless type is equipped with pulsation damper 108. Therefore, the fuel supply system of the returnless type requires an attaching portion, such as a flange, for joining pulsation damper 108 to delivery pipe 103, and an arrangement for sealing the joining part. Thus, the fuel supply system of the returnless type may have a complex structure, and cannot easily be reduced in cost. Besides, such fuel supply system of the returnless type cannot easily be laid out in a small space in an engine room.

Figure 1:
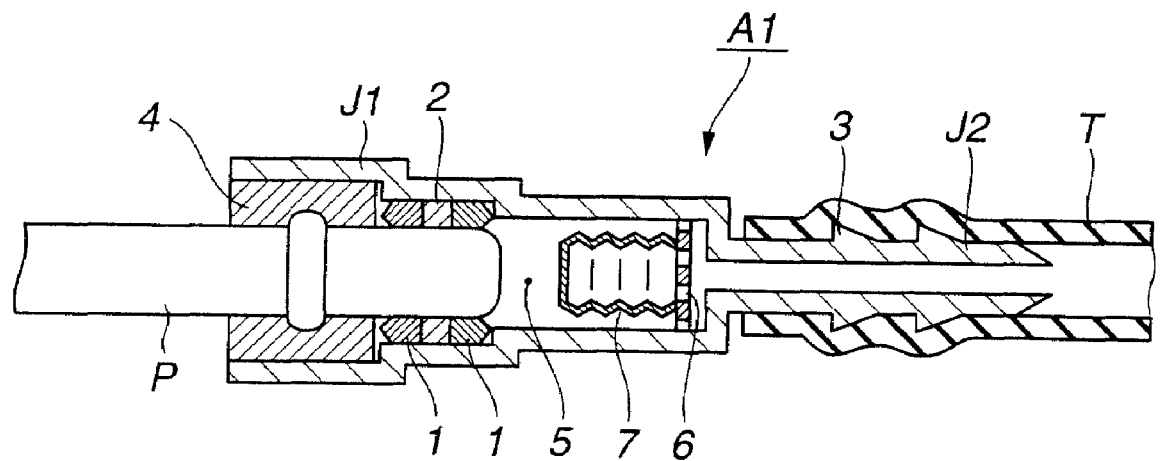
FIG. 1 is a sectional view showing a fluid coupling according to an embodiment of the present invention.

FIG. 1 is a sectional view showing a fluid coupling A1 according to an embodiment of the present invention. Each of fluid couplings (or quick connectors) of the following embodiments is applicable to joint between supply tube 102 (a resin tube T) and delivery pipe 103 (a metal pipe P) in the fuel supply system of the returnless type of FIG. 11. However, the fluid couplings are not limited to the following embodiments in positioning and detailed structure, and may be applicable as modifications and variations of such embodiments.

Fluid coupling A1 of FIG. 1 is a straight type, and includes one or first joining portion J1, and the other or second joining portion J2 provided integrally with first joining portion J1. First joining portion J1 and second joining portion J2 form a body of fluid coupling A1. First joining portion J1 includes two O rings 1 and a back-up ring 2. O rings 1 and back-up ring 2 are attached to an inside surface of first joining portion J1. Second joining portion J2 includes a projecting portion 3. Projecting portion 3 for retaining a tube is formed on an outer circumference of second joining portion J2. Metal pipe P (delivery pipe) and resin tube T (supply tube) are connected with first joining portion J1 and second joining portion J2, respectively, in an assembled state. Specifically, metal pipe P together with a spacer 4 is fit into first joining portion J1, and resin tube T is fit over second joining portion J2. Fuel which is fluid flows through fluid coupling A1 in the assembled state.

The body of fluid coupling A1 is formed by material resistant to fuel. In this example, the body of fluid coupling A1 is formed by material composed mainly of a resin selected from a group consisting of polyamide, polyolefin, polysulfide, fluorocarbon resin, polyester, polyacetal and polyketone.

The body of fluid coupling A1 is formed with a fluid channel 5 extending through the body of fluid coupling A1. Fluid coupling A1 includes a support 6, and a pulsation absorber provided in fluid channel 5. The pulsation absorber of this embodiment is a bellows 7. Specifically, support 6 is fixed in fluid channel 5, and bellows 7 is supported by support 6. Pulsation absorber or bellows 7 is arranged to deform in a same direction as fluid to flow in fluid channel 5 pulsates, and thereby absorb the pulsation of the fluid. A part or first part of fluid channel 5 at which bellows 7 is provided has a section smaller than a section of other part or second part of fluid channel 5.

Support 6 is formed by material of the same kind as the material forming the body of fluid coupling A1. In this example, support 6 is formed by material composed mainly of glass fiber reinforced polyamide 12. Support 6 is formed with at least one opening to pass the fluid through the opening. Support 6 is fixed to the body of fluid coupling A1 by rotary welding.

Bellows 7 is formed by resin or rubber. In this example, bellows 7 is formed by polyamide 12, and molded by blow molding. Bellows 7 is joined to support 6 air-tightly by welding, and is arranged to act as an air spring. Besides the above-mentioned polyamide 12, bellows 7 may be formed by a thermoplastic resin, such as a polyamide-based thermoplastic resin, a polyolefin-based thermoplastic resin, a fluorocarbon-based thermoplastic resin, a polyester-based thermoplastic resin, or a polysulfide-based thermoplastic resin. Bellows 7 may also be formed by a thermoplastic elastomer, or a rubber, such as a fluorocarbon-based rubber, a nitrile-based rubber, or an acrylic-based rubber.

In fluid coupling A1 of this embodiment, pulsation absorber or bellows 7 is provided in fluid channel 5, and is arranged to deform in the same direction as the pulsation of the fluid to flow in fluid channel 5, and thereby absorb the pulsation of the fluid effectively. Thus, pulsation absorber or bellows 7 confronts a propagation direction of the pulsation of the fluid, in an assembled state in the fuel supply system or fluid delivery system. Specifically, in the fuel supply system, when the fuel is supplied from the fuel tank to metal pipe P, and pulsation of the fuel originating from the fuel injection action of fuel injectors 104 occurs on the part of metal pipe P, bellows 7 confronting the propagation direction of the pulsation deforms springily or elastically, or expand and contract, to absorb the pulsation of the fuel effectively.

Thus, fluid coupling A1 of this embodiment includes pulsation absorber or bellows 7 provided in fluid channel 5. Hence, fluid coupling A1 of this embodiment does not require an additional space for a pulsation absorber. In fluid channel 5, pulsation absorber or bellows 7 is arranged to act as air spring. Therefore, fluid coupling A1 has a simple structure having a small size and a small number of elements, and is capable of damping the pulsation of the fluid occurring in the fuel supply system. With fluid coupling A1 of this embodiment, the fuel supply system of the returnless type of FIG. 11 can have a structure without pulsation damper 108, and thus can be reduced in weight and cost, and can be easily laid out in a limited space in an engine room.

Besides, pulsation absorber or bellows 7 of fluid coupling A1 of this embodiment is formed by resin or rubber. Thus, bellows 7 is light in weight and low in cost, and has a property of deforming efficiently to absorb the pulsation of the fluid effectively. Additionally, since resin or rubber exhibits an excellent formability, bellows 7 can be formed easily to have a desired spring constant.

Further, support 6 of fluid coupling A1 of this embodiment is fixed to the body of fluid coupling A1 by rotary welding, and bellows 7 is joined to support 6 by welding. Thus, these elements can be joined to one another easily and securely without using joining parts. Therefore, the structure of fluid coupling A1 can be further simplified and reduced in weight.

Besides, fluid coupling A1 of this embodiment may be applicable between supply line 101 and supply tube 102 in the fuel supply system of the returnless type of FIG. 11. In this case, supply line 101 may be connected with first joining portion J1, and bellows 7 can absorb pulsation of the fuel which originates from the discharging action of the fuel pump.

Further, fluid coupling A1 of this embodiment is formed with fluid channel 5, and the section of the part of fluid channel 5 at which bellows 7 is provided is smaller than the section of the other part of fluid channel 5. The thus-narrowed part of fluid channel 5 acts as an orifice, and thereby is capable of reducing the propagation of the pulsation of the fuel.

Figure 2:
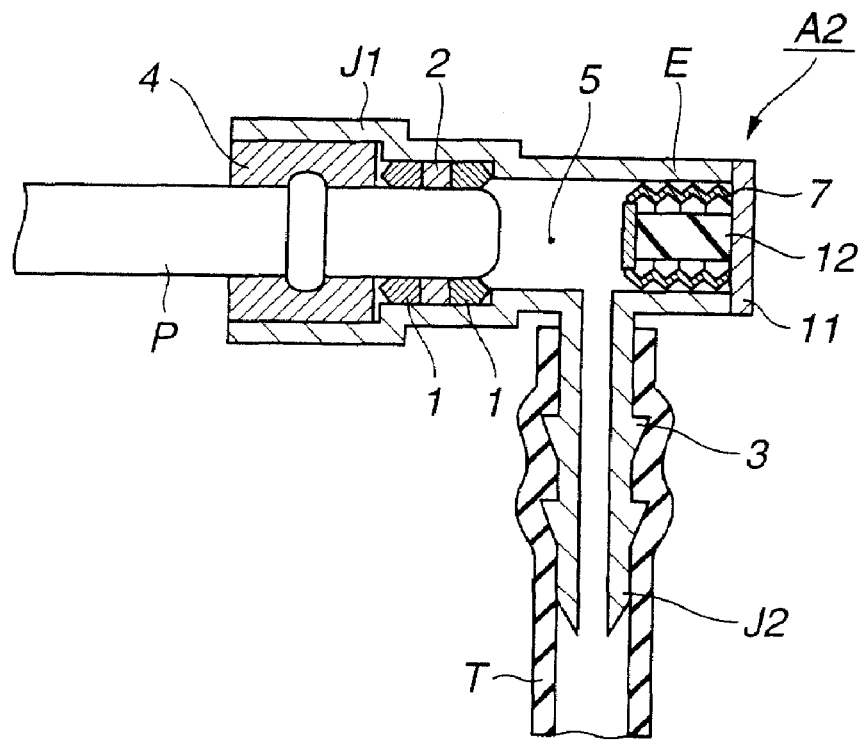
FIG. 2 is a sectional view showing a fluid coupling according to another embodiment of the present invention.

FIG. 2 is a sectional view showing a fluid coupling A2 according to another embodiment of the present invention. Elements in FIG. 2 that are identical or equivalent to the elements shown in FIG. 1 are indicated by the same reference marks, and may not be described in detail in this part of description.

Fluid coupling A2 of FIG. 2 is an elbow type, and includes first joining portion J1, and second joining portion J2 provided integrally with first joining portion J1. Second joining portion J2 is arranged substantially orthogonal to first joining portion J1 so that first joining portion J1 and second joining portion J2 form an elbow portion. Fluid coupling A2 also includes an extension portion E extending from the elbow portion coaxially with first joining portion J1. Extension portion E has an open end opening in the coaxial direction or opposite direction from the elbow portion, and includes a support 11, and a pulsation absorber arranged to absorb pulsation of fluid to flow in fluid channel 5 in an assembled state.

Support 11 of this embodiment is a plate member formed by glass fiber reinforced polyamide 12. The pulsation absorber of this embodiment is attached to support 11, and support 11 is fixed to the open end of extension portion E by rotary welding so as to block up the open end of extension portion E.

The pulsation absorber of this embodiment includes bellows 7 and an elastic member. Bellows 7 of this embodiment is formed by resin or rubber, as in the foregoing embodiment. The elastic member of this embodiment is provided inside bellows 7, and is arranged to deform springily or elastically, or expand and contract, together with bellows 7. The elastic member of this embodiment is a molded member 12 formed by resin or rubber. Molded member 12 of this embodiment is made of fluoro rubber compression-molded in a cylindrical form, and is provided coaxially with bellows 7.

Besides the above-mentioned fluoro rubber, molded member 12 may be made of rubber of various types, such as nitrile rubber, acrylic rubber, silicone rubber, fluorinated silicone rubber, hydrin rubber, urethane rubber, ethylene-propylene rubber, or butyl rubber. Molded member 12 may also be made of resin of various types, such as polyolefin, polysulfide, fluorocarbon resin, polyester, polyacetal, polyketone, polyvinyl chloride, or thermoplastic elastomer.

Thus, in fluid coupling A2 of this embodiment, the pulsation absorber is composed of bellows 7 and molded member 12 arranged to act respectively as air spring and a rubber spring by deforming springly or elastically, or expanding and contracting together. Additionally, bellows 7 and molded member 12 each formed by resin or rubber exhibit high damping effects. Therefore, the pulsation absorber of this embodiment can absorb the pulsation of the fluid highly effectively even when pressure of the fluid is relatively high.

Besides, since the pulsation absorber of this embodiment is composed of bellows 7 and molded member 12 each formed by resin or rubber, the pulsation absorber can be formed to have a desired spring constant with an increased degree of freedom, and thereby can adapt to various intensities of pressure and pressure pulsation in the fluid. Additionally, fluid coupling A2 of this embodiment has a simple structure having a small size and a small number of elements, as in the foregoing embodiment, and the fuel supply system adopting fluid coupling A2 of this embodiment can be reduced in weight and cost, and can be easily laid out in a limited space in an engine room.

Figure 3:
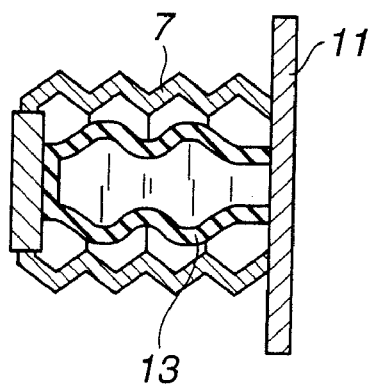
FIG. 3 is a sectional view showing a pulsation absorber applicable to the fluid coupling, according to still another embodiment of the present invention.

FIG. 3 is a sectional view showing a pulsation absorber applicable to the fluid coupling, according to still another embodiment of the present invention. The pulsation absorber of FIG. 3 includes bellows 7 and an elastic member. Bellows 7 is formed by resin or rubber. The elastic member of this embodiment is provided inside bellows 7, and is arranged to deform springily or elastically, or expand and contract, together with bellows 7. The elastic member of this embodiment includes a hollow-molded member 13. Hollow-molded member 13 is formed by resin or rubber in a bellows form.

Figure 4:
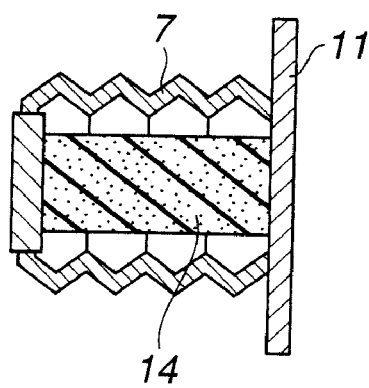
FIG. 4 is a sectional view showing a pulsation absorber applicable to the fluid coupling, according to still another embodiment of the present invention.

FIG. 4 is a sectional view showing a pulsation absorber applicable to the fluid coupling, according to still another embodiment of the present invention. The pulsation absorber of FIG. 4 includes bellows 7 and an elastic member. Bellows 7 is formed by resin or rubber. The elastic member of this embodiment is provided inside bellows 7, and is arranged to deform springily or elastically, or expand and contract, together with bellows 7. The elastic member of this embodiment includes a foam-molded member 14. Foam-molded member 14 is formed by resin or rubber containing numerous bubbles, and shaped in a cylindrical form.

Figure 5:
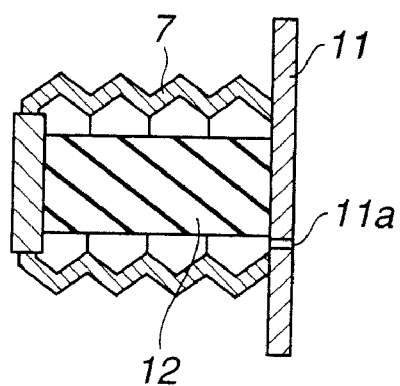
FIG. 5 is a sectional view showing a pulsation absorber applicable to the fluid coupling, according to still another embodiment of the present invention.

FIG. 5 is a sectional view showing a pulsation absorber applicable to the fluid coupling, according to still another embodiment of the present invention. The pulsation absorber of FIG. 5 includes bellows 7 and an elastic member. Bellows 7 is formed by resin or rubber. The elastic member of this embodiment is provided inside bellows 7, and is arranged to deform springily or elastically, or expand and contract, together with bellows 7. The elastic member of this embodiment includes molded member 12. Molded member 12 is formed by resin or rubber in a cylindrical form. Support 11 of this embodiment is formed with an air hole 11a exposing an inside part of bellows 7 to open air. When bellows 7 undergoes load of the pulsation of the fluid, bellows 7 takes air in and out of the inside part via air hole 11a. Therefore, the pulsation absorber of this embodiment can obtain increased damper effects.

Figure 6:
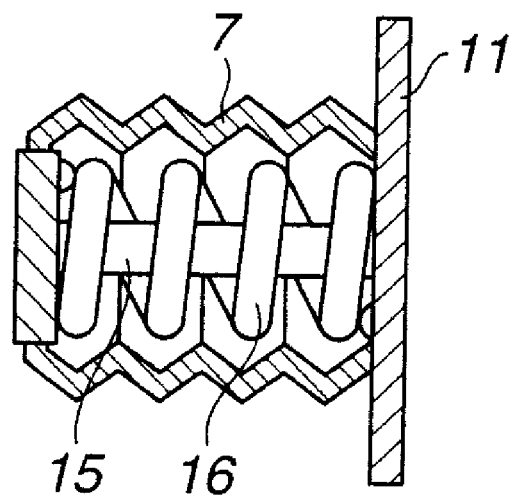
FIG. 6 is a sectional view showing a pulsation absorber applicable to the fluid coupling, according to still another embodiment of the present invention.

FIG. 6 is a sectional view showing a pulsation absorber applicable to the fluid coupling, according to still another embodiment of the present invention. The pulsation absorber of FIG. 6 includes bellows 7 and an elastic member. Bellows 7 is formed by resin or rubber. The elastic member of this embodiment is provided inside bellows 7, and is arranged to deform springily or elastically, or expand and contract, together with bellows 7. The elastic member of this embodiment includes a molded member 15 and a coil spring 16. Molded member 15 is formed by resin or rubber in a thin cylindrical form. Coil spring 16 is disposed concentrically outside molded member 15.

Figure 7:
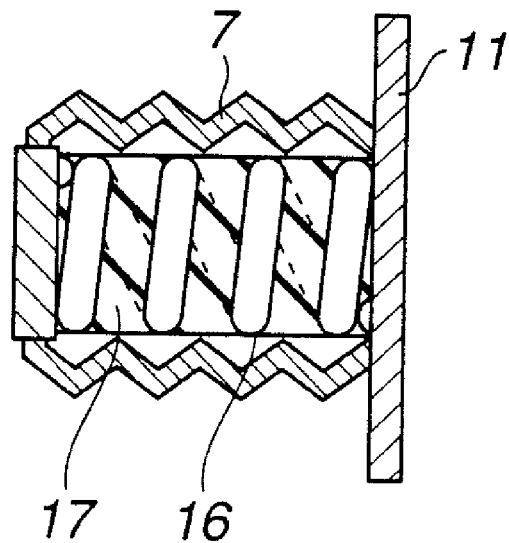
FIG. 7 is a sectional view showing a pulsation absorber applicable to the fluid coupling, according to still another embodiment of the present invention.

FIG. 7 is a sectional view showing a pulsation absorber applicable to the fluid coupling, according to still another embodiment of the present invention. The pulsation absorber of FIG. 7 includes bellows 7 and an elastic member. Bellows 7 is formed by resin or rubber. The elastic member of this embodiment is provided inside bellows 7, and is arranged to deform springily or elastically, or expand and contract, together with bellows 7. The elastic member of this embodiment includes a composite-molded member 17. Composite-molded member 17 includes coil spring 16 insert-molded in resin or rubber.

The pulsation absorbers of FIGS. 3~7 are applicable to fluid couplings A1 and A2 of FIGS. 1 and 2, and are capable of obtain similar effects and advantages as in the foregoing embodiments. Especially, the pulsation absorber composed of bellows 7 and at least one of the molded members and the coil spring can be formed to have a desired spring constant with a further increased degree of freedom.

The pulsation absorbers of FIGS. 3 and 5~7 may use a foam-molded member as shown in FIG. 4 in place of each of the molded members of FIGS. 3 and 5~7. In each case, the pulsation absorbers can obtain a desired spring constant by varying foaming rates of the foam-molded member. Besides, each of the molded members may be impregnated with fluid such as oil, and thereby can be formed to have an adjusted ability to absorb the pulsation while being prevented from deterioration. Additionally, air hole 11a of support 11 of FIG. 5 is applicable to the foregoing embodiments and the following embodiments.

Figure 8:
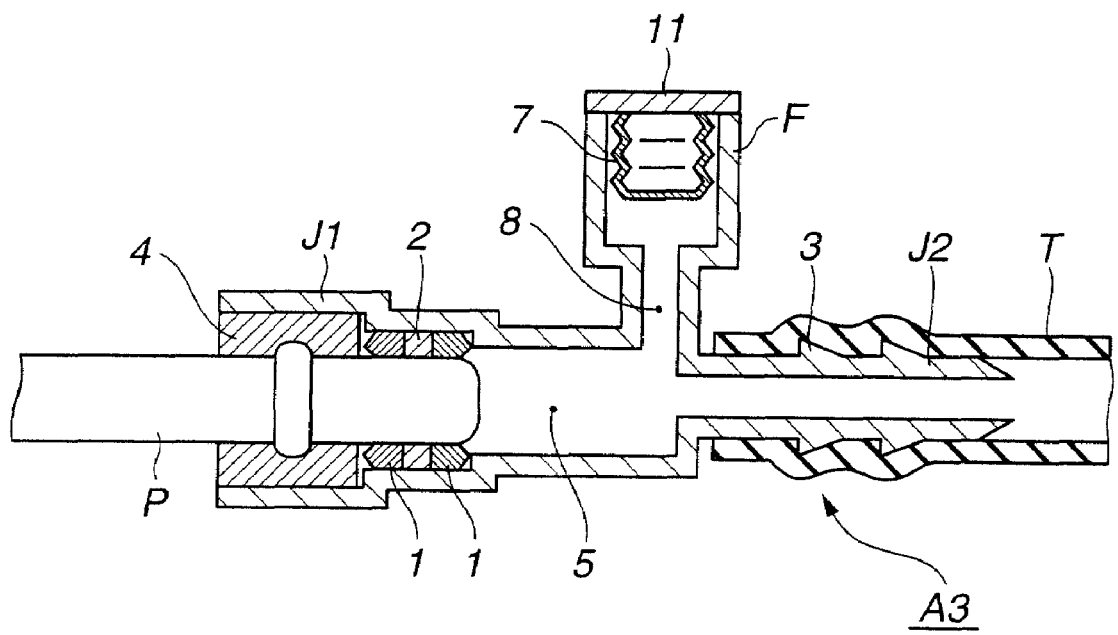
FIG. 8 is a sectional view showing a fluid coupling according to still another embodiment of the present invention.

FIG. 8 is a sectional view showing a fluid coupling A3 according to still another embodiment of the present invention. Elements in FIG. 8 that are identical or equivalent to the elements shown in FIGS. 1 and 2 are indicated by the same reference marks, and may not be described in detail in this part of description.

Fluid coupling A3 of FIG. 8 is a straight type, and includes first joining portion J1, and second joining portion J2 provided integrally with first joining portion J1. The body of fluid coupling A3 is formed integrally with a damping chamber F. Damping chamber F is located at a middle part of the body and branches off from fluid channel 5. Fluid coupling A3 of this embodiment includes pulsation absorber disposed in damping chamber F, and arranged to absorb pulsation of fluid to flow in fluid channel 5 in an assembled state. The pulsation absorber of this embodiment is bellows 7.

Damping chamber F communicates with fluid channel 5 via a communicating passage 8, and is formed with an open end opening in opposite direction from communicating passage 8. Communicating passage 8 is formed narrower than fluid channel 5, or is formed to have an internal sectional size smaller than fluid channel 5. Bellows 7 is attached to support 11, and support 11 is fixed to the open end of damping chamber F, as in the foregoing embodiment.

Thus, fluid coupling A3 of this embodiment is arranged to absorb the pulsation of the fluid effectively by bellows 7 deforming, or expanding and contracting, springily or elastically, and damping chamber F acting as a Helmholtz resonating chamber. Damping chamber F branches off perpendicularly from fluid channel 5, and pulsation absorber or bellows 7 is disposed in thus-branched damping chamber F. Thus, the pulsation absorber of this embodiment does not hamper the flow of the fluid, and therefore can avoid pressure loss of the fluid.

Additionally, fluid coupling A3 of this embodiment has a simple structure having a small size and a small number of elements, as in the foregoing embodiments, and the fuel supply system adopting fluid coupling A3 of this embodiment can be reduced in weight and cost, and can be easily laid out in a limited space in an engine room. Besides, the pulsation absorbers of FIGS. 2~7 are applicable to fluid coupling A3 of FIG. 8.

Figure 9:
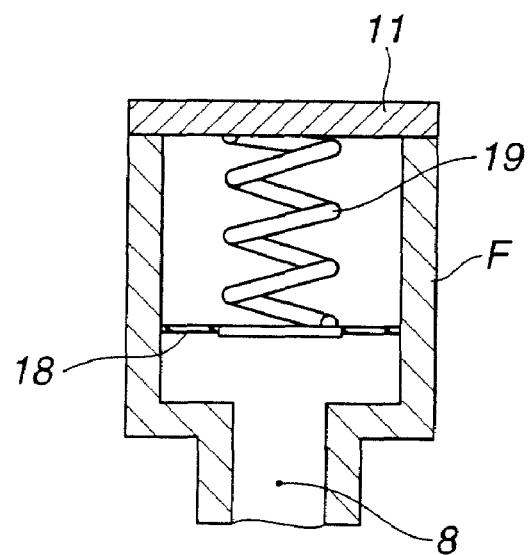
FIG. 9 is a sectional view showing a pulsation absorber applicable to the fluid coupling of FIG. 8, according to still another embodiment of the present invention.

FIG. 9 is a sectional view showing a pulsation absorber applicable to fluid coupling A3 of FIG. 8, according to still another embodiment of the present invention. The pulsation absorber of FIG. 9 includes a diaphragm 18 and an elastic member. Diaphragm 18 is formed by resin or rubber, and is positioned to partition damping chamber F. The elastic member of this embodiment is arranged to deform springily or elastically, or expand and contract, in conjunction with deformation of diaphragm 18. The elastic member of this embodiment is a coil spring 19 provided between diaphragm 18 and support 11.

The fluid coupling adopting the pulsation absorber of this embodiment can obtain similar effects and advantages as in the foregoing embodiments. The pulsation absorber of FIG. 9 is applicable to fluid coupling A2 of FIG. 2 of the elbow type. The pulsation absorber of this embodiment may adopt each of the elastic members of FIGS. 2~7 in place of coil spring 19 of FIG. 9. Diaphragm 18 and the elastic member (molded member) may be formed integrally from identical material by integral molding. Thereby, the fluid coupling can have a structure with a small number of elements, and can be reduced in cost.

According to another aspect of the present invention, the fluid coupling includes: means (5) for passing fluid; and means (7; 7, 12; 7, 13; 7, 14; 7, 15, 16; 7, 17, 16; 18, 19) for absorbing pulsation of the fluid by deforming in a same direction as the fluid pulsates.

This application is based on a prior Japanese Patent Application No. 2004-163141 filed on Jun. 1, 2004. The entire contents of this Japanese Patent Application No. 2004-163141 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A fluid coupling for use in a fuel supply system of a vehicle, comprising:
   a body formed with a fluid channel and formed of a material selected from the group consisting of polyamide, polyolefin, polysulfide, fluorocarbon resin, polyester, polyacetal, and polyketone;
   a pulsation absorber provided in the fluid channel, and arranged to deform in a same direction as fluid to flow in the fluid channel pulsates, and thereby to absorb pulsation of the fluid, said pulsation absorber being a bellows formed of a material resistant to fuel, the material being selected from the group consisting of a polyamide-based thermoplastic resin, a polyolefin-based thermoplastic resin, a fluorocarbon-based thermoplastic resin, a polyester-based thermoplastic resin, a polysulfide-based thermoplastic resin, a thermoplastic elastomer, a fluorocarbon-based rubber, a nitrile-based rubber, and an acrylic rubber; and
   a support which is fixed to said body of said fluid coupling by rotary welding, in which the bellows is jointed to the support air-tightly by welding, the support being plate-shaped and located perpendicular to an axis of the fluid channel, the support having an outer peripheral portion which is fixed to an inner wall of said body.

2. A fluid coupling as claimed in claim 1, wherein said support is formed of a material selected from the group consisting of polyamide, polyolefin, polysulfide, fluorocarbon resin, polyester, polyacetal, and polyketone.

3. A fluid coupling as claimed in claim 2, wherein said body and said support are formed of the same material.

4. A method of producing a fluid coupling for use in a fuel supply system of a vehicle, the fluid coupling including a body formed with a fluid channel and formed of a material selected from the group consisting of polyamide, polyolefin, polysulfide, fluorocarbon resin, polyester, polyacetal, and polyketone; a support which is plate-shaped and fixed to said body of said fluid coupling; and a pulsation absorber provided in the fluid channel and joined to said support air-tightly, the pulsation absorber being arranged to deform in a same direction as fluid to flow in the fluid channel pulsates thereby to absorb pulsation of the fluid, said pulsation absorber being a bellows formed of a material resistant to fuel, the material being selected from the group consisting of a polyamide-based thermoplastic resin, a polyolefin-based thermoplastic resin, a fluorocarbon-based thermoplastic resin, a polyester-based thermoplastic resin, a polysulfide-based thermoplastic resin, a thermoplastic elastomer, a fluorocarbon-based rubber, a nitrile-based rubber, and an acrylic rubber,
   the method comprising:
   locating said support in the fluid channel to be perpendicular to an axis of the fluid channel;
   rotary-welding said support to an inner wall of the body of said fluid coupling so as to fix an outer peripheral portion of said support to the inner wall of the body of said fluid coupling; and
   welding the bellows to the support so as to join the bellows to the support air-tightly.

* * * * *